July 22, 1947.     H. A. MILLER     2,424,485
ADJUSTABLE JIG BUSHING
Filed July 3, 1944     2 Sheets-Sheet 1
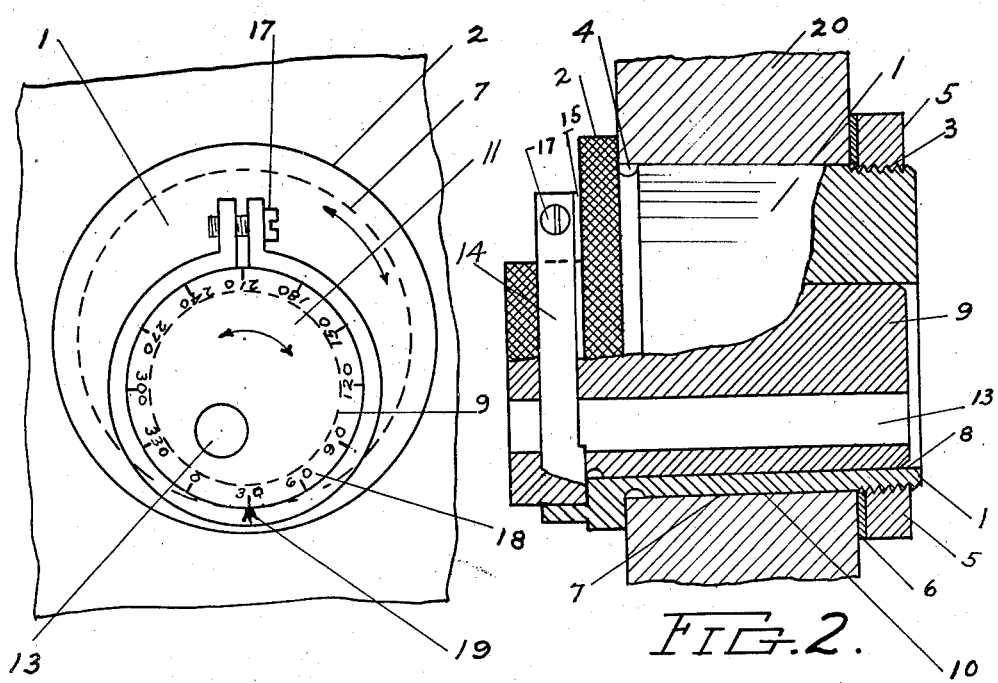
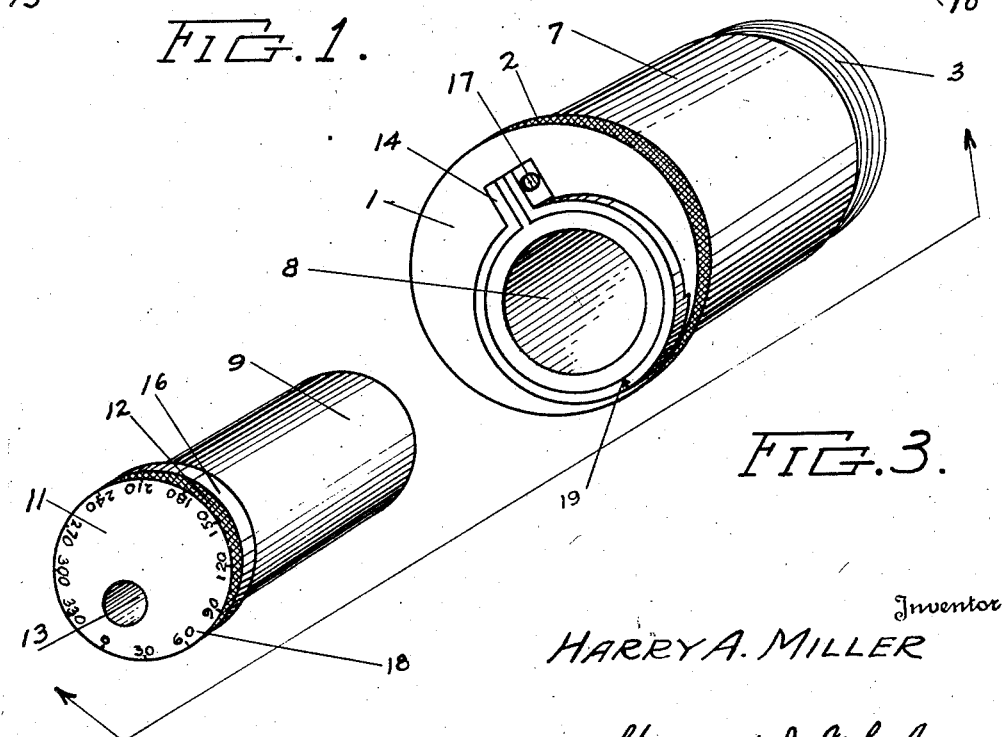
Inventor
HARRY A. MILLER
By Howard J. Whelan
Attorney July 22, 1947.  H. A. MILLER  2,424,485
ADJUSTABLE JIG BUSHING
Filed July 3, 1944   2 Sheets-Sheet 2

Inventor
HARRY A. MILLER.
By Howard J. Whelan.
Attorney

Patented July 22, 1947

2,424,485

UNITED STATES PATENT OFFICE 2,424,485

ADJUSTABLE JIG BUSHING

Harry A. Miller, Dundalk, Md., assignor to Thomas W. Maskell, Baltimore, Md.

Application July 3, 1944, Serial No. 543,407

2 Claims. (Cl. 77—62)

This invention refers to jigs and other facilities for drilling material accurately in a quantitative manner. More particularly it refers to the bushing used in connection with such jigs and facilities. It has among its objects to provide bushing means that may be positioned after placement to produce more accurately the alignment of holes to be drilled in the article selected. Another object is to have the device as simple in structure as possible, and to have parts capable of being produced in quantities, of standard form, yet capable of being moved and located after placement in the jig to obtain a more accurate change in position of the bushing to be drilled through, to suit the conditions to be provided for. A further object is to provide a jig bushing means that may be placed in holes roughly located primarily in the jig plate, and then adjusted accurately individually to meet the requirements actually to be provided for.

Other objects will become apparent as the invention is more fully set forth.

The conventional bushing used in a jig has to be accurately located primarily. If it is not, there is nothing that can be done to relocate it accurately, without mutilating it or the jig plate. A new plate can be utilized, but such involves considerable trouble and cost. If one hole to take a bushing is "off" as compared with the others to be used in the jig, its accuracy destroys the value of the others. The result is, the average work obtained through the use of the bushings in that jig tends to be haphazard. If the skill of the operator is excellent and other conditions are favorable, his work in locating the bushings in the jig may be very satisfactory. In this invention, the purpose is to enable an average worker or mechanic or toolmaker, capable of producing a jig with the bushing therein, to position the bushings in the jig to a most accurate degree, quickly with the least possible amount of spoilt jigs, and with definite assurance that the work will be done accurately.

In the descripiton of this device, which consists of jig liner and a slip bushing for same, reference is made to the embodiment in the drawings in which:

Figure 1 is a plan view of a liner and bushing embodying this invention installed in a jig plate;

Figure 2 is an elevational view of Figure 1 with the jig plate and parts partly broken away to show the interior construction;

Figure 3 is a view of the bushing and liner in perspective and separated to indicate their relative positions during assembling or disassembling;

Similar reference characters refer to similar parts throughout the drawings.

Figure 4:
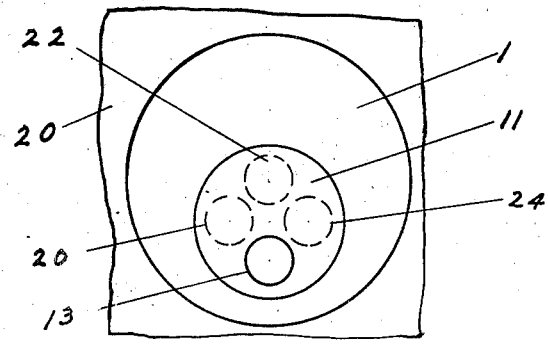
Figure 4 is a diagram of the liner and bushing assembled to one another, with the liner assumed to be stationary and the bushing positions rotated therein.

In the drawings which illustrate a form of this invention by way of example, 1 represents a shoulder liner having a knurled flange 2 integrally formed on its upper portion, a thread 3 on its lower portion, an undercut 4 provided under the flange, and adapted for a pressfit into a jig 20. A nut 5 and washer 6 provided for attachment to the threads 3 serves to additionally resist any turning after the liner is placed therein, in the somewhat conventional manner. A bushing hole 8 is eccentrically located in the body of the liner 1, and passes longitudinally therethrough, with its axis parallel to that of the body. The external wall 7 of the liner is preferably tapered and of circular or cylindrical form adapted to fit within a circular hole 10 drilled to receive it in the jig plate 20.

The bushing 11 consists of a cylindrical body 9 adapted to fit closely within the hole 8. It also has a knurled shoulder flange 12 and smooth shoulder 16 integrally formed on its upper end portion. The bushing is preferably tapered slightly on its external wall surface 9, while the hole 8 that it fits in, is likewise preferably tapered. This is to produce a tight fit when the bushing is driven into the liner. The bushing 11 has a circular hole 13 passing longitudinally through it with its axis parallel to that of the body of the bushing. This hole 13 is located eccentrically in the bushing.

A clamp 14 forming part of the upper face of the shoulder liner 1 contacts the smooth shoulder 16 of the bushing 11 and allows the bushing to be adjusted in the liner regardless of the positions in which the liner and bushing are turned in the jig plate with respect to each other and lock them together. The clamp 14 is provided with an undercut portion 15 and set screw 17 to retain the graduations 18 shown on the face of the bushing 11 in adjusted relationship with the mark 19 shown on the face of clamp 14. These graduations are used to show the angular position of the hole 13 in the bushing 11 to the hole in liner 1.

There are other conventional methods of locking the liner, bushing and plate together so they will retain their relative positions while the work of drilling the selected object is being done. These are known to the art and will not be described herein.

In order to explain the operation of the device and its general functions reference is made to the diagrams in Figures 4, 5, 6 and 7, which shows the various positions in which the liner and bushing can be located in the jig plate with respect to each other.

In Figure 4 the liner 1 is indicated in a stationary position in the jig 20, while the bushing 11 is located in its longitudinal hole 8. The hole 13 in the bushing is shown in one position while dotted outlines 22, 24 and 26 indicate other locations that could be used, assuming the liner is kept still. The hole 13 is positioned to 22, 24 and 26 by rotating the bushing 11 on its central axis. The knurling on the shoulder flange enables this to be done manually, or if desirable a tool or pipe wrench could be used.

Figure 5:
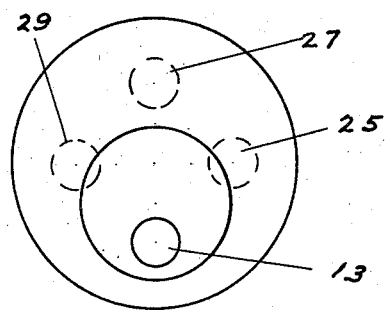
Figure 5 is a diagram with the bushing stationary and the liner rotated about its axis.

In Figure 5 the liner 1 is shown rotated while the bushing 11 is kept stationary within it. The hole 13 of the bushing 11 is shown in one position while the dotted outlines 25, 27 and 29 indicate other locations that could be used to indicate its effect on the location of the drilled hole.

Figure 6:
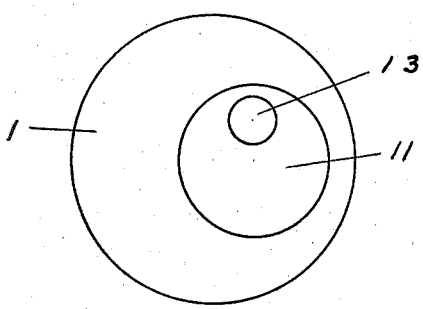
Figure 6 shows the bushing and liner moved to a different position to that indicated in Figure 5, assuming that both liner and bushing have been adjusted therefrom.

In Figure 6 the liner and bushing are shown moved independently of each other in the jig to show how they may be variously positioned with respect to each other and adjusted minutely in doing so.

Figure 7:
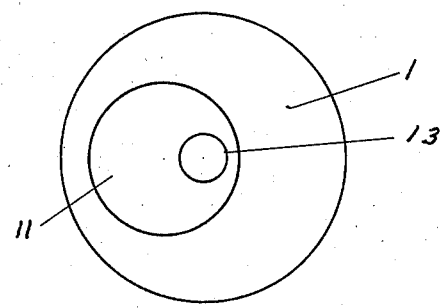
Figure 7 shows the form of the bushing and liner when the hole in the bushing is aligned with the central portion of the liner, other positions can be obtained as well as others eccentric thereto.
Figure 8:
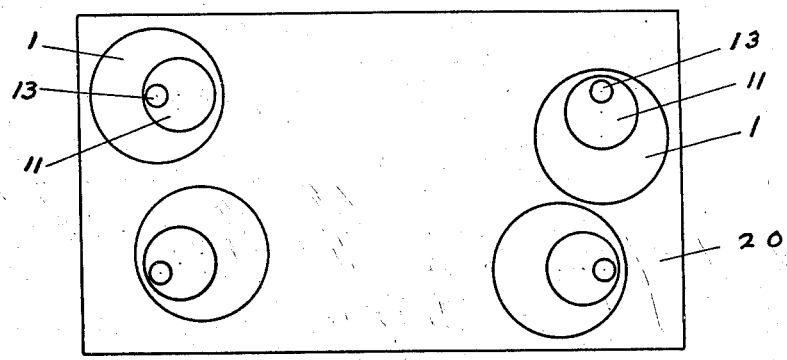
Figure 8 indicates a jig plate with the bushings and liners therein located in various positions to show the adjustments that may be made for the drilling of the holes through the bushings.

The adjustment possible with the device is considerable. The combinations of a liner with central drilling may be used with an eccentrically drilled bushing or vice versa, where such preference is desirable and the possibility of variations is relatively small. In Figure 7, the turning of the bushing 11 and liner 1 is made to a point where the drill hole 13 in the bushing is centered in the liner, indicating that the bushing and liner can be aligned with their drilling holes in the same relative position as those in the conventional bushing and liner, that is, along the center line of the liner. This is done by making the distance from the center of the body to the center of the hole in the liner, equal to the distance from the center of the body to the center of the hole in the bushing or vice versa.

Some of the advantages of this type of bushing means in a jig plate are as follows:

(1) It takes care of inaccuracies in the location of the drill holes in a jig by providing adjustments of the bushings to enable the holes to be placed accurately;

(2) The bushing and liner can be adjusted independently of each other;

(3) The bushing and liner can take a more substantial form than that of conventional liners and bushings;

(4) Time is saved in locating holes in the jig;

(5) A jig that would be spoiled if inaccurately drilled and conventional bushings and liners used, can be saved by this invention;

(6) Changes in hole locations can be varied without requiring new jig plates, thus saving time and cost and preventing the waste of the original jig;

(7) Production can be increased as less skill in making jig plates is required through the use of this invention;

(8) The possible use of jigs using this invention can be increased;

(9) A bushing is provided that can be adjusted in the liner from "dead center" to various positions in the jig without the aid of a toolmaker or mechanic.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. In a shoulder liner and bushing unit comprising in combination, a shoulder liner having tapered outside walls and threaded at its lower end, an eccentrically placed tapered hole passing longitudinally through said shoulder liner, a bushing having its outside wall tapered to fit the taper bore of said shoulder liner, said bushing having an eccentrically placed hole passing longitudinally therethrough, and means for locking the bushing in the shoulder liner in fixed relationship to each other.

2. In a shoulder liner and bushing unit comprising in combination, a shoulder liner having tapered outside walls and threaded at its lower end, an eccentrically placed tapered hole passing longitudinally through said shoulder liner, a bushing having its outside wall tapered to fit the taper bore of said shoulder liner, said bushing having an eccentrically placed hole passing longitudinally therethrough, means for locking the bushing in the shoulder liner in fixed relationship to each other, and locking means on said shoulder liner to adjustably position it within a jig.

HARRY A. MILLER.

REFERENCES CITED

The following references are of record in the file of this patent:

UNITED STATES PATENTS

| Number | Name | Date |
|---|---|---|
| 1,603,022 | Briney | Oct. 12, 1926 |
| 1,703,549 | Sergeeff | Feb. 26, 1929 |
| 2,232,374 | Drews | Feb. 18, 1941 |
| 2,381,943 | Williams | Aug. 14, 1945 |

FOREIGN PATENTS

| Number | Country | Date |
|---|---|---|
| 393,965 | Germany | Apr. 19, 1924 |

OTHER REFERENCES

American Machinist, June 9, 1921, pages 997–998.